United States Patent
Ihn et al.

(10) Patent No.: US 10,933,600 B2
(45) Date of Patent: Mar. 2, 2021

(54) THREE-DIMENSIONAL PRINTING OF COMPOSITE REPAIR PATCHES AND STRUCTURES

(71) Applicants: The Boeing Company, Chicago, IL (US); Seoul National University R&DB Foundation, Seoul (KR)

(72) Inventors: Jeong-Beom Ihn, Bellevue, WA (US); Sung-Hoon Ahn, Seongnam (KR); Gil-Yong Lee, Seoul (KR); Hyung-Soo Kim, Seoul (KR); Min-Soo Kim, Seoul (KR); Ho-Jin Kim, Seoul (KR); Soo-Hong Min, Seoul (KR)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 15/915,139

(22) Filed: Mar. 8, 2018

(65) Prior Publication Data
US 2019/0275755 A1 Sep. 12, 2019

(51) Int. Cl.
*B29C 73/12* (2006.01)
*B29C 64/321* (2017.01)
(Continued)

(52) U.S. Cl.
CPC ............ *B29C 73/12* (2013.01); *B29C 64/165* (2017.08); *B29C 64/209* (2017.08);
(Continued)

(58) Field of Classification Search
CPC ..... B29C 73/12; B29C 64/321; B29C 64/209; B29C 64/165; B29C 70/384; B29C 70/545; B29C 70/683; B29C 70/78; B29C 73/10; B29C 70/30; B29C 70/38; B29C 70/388; B29C 70/382; B29C 70/386; B33Y 10/00;
(Continued)

(56) References Cited

U.S. PATENT DOCUMENTS

| 4,824,500 A | * | 4/1989 | White | ................... B29C 73/04 156/153 |
| 6,060,124 A | * | 5/2000 | Ikegawa | ............... B29B 15/122 118/665 |

(Continued)

FOREIGN PATENT DOCUMENTS

| CN | 107379539 A1 | 11/2017 |
| WO | 2017210490 A1 | 12/2017 |

OTHER PUBLICATIONS

Extended European Search Report dated Jul. 31, 2019 in European Patent Application No. 19161763.8 (European counterpart to the instant U.S. patent application).

*Primary Examiner* — Matthew J Daniels
*Assistant Examiner* — Gregory Chad Grosso
(74) *Attorney, Agent, or Firm* — Ostrager Chong Flaherty & Broitman P.C.

(57) ABSTRACT

Methods and apparatus for automating the fiber laying process during the repair of composite structures made of fiber-reinforced plastic material based on the three-dimensional printing technique. Continuous fiber rovings (e.g., carbon fibers) impregnated with liquid epoxy can be directly printed onto the damaged surface of the composite structure (e.g., an aircraft component made of carbon fiber-reinforced plastic) without human manipulation in an autonomous manner.

13 Claims, 15 Drawing Sheets

(51) Int. Cl.
  *B29C 64/209* (2017.01)
  *B29C 64/165* (2017.01)
  *B29C 70/38* (2006.01)
  *B29C 70/54* (2006.01)
  *B29C 70/78* (2006.01)
  *B29C 73/10* (2006.01)
  *B29C 70/68* (2006.01)
  *B33Y 10/00* (2015.01)
  *B33Y 30/00* (2015.01)
  *B29K 63/00* (2006.01)
  *B29K 307/04* (2006.01)
  *B29L 31/30* (2006.01)
  *B29K 105/06* (2006.01)

(52) U.S. Cl.
  CPC .......... *B29C 64/321* (2017.08); *B29C 70/384* (2013.01); *B29C 70/545* (2013.01); *B29C 70/683* (2013.01); *B29C 70/78* (2013.01); *B29C 73/10* (2013.01); *B29K 2063/00* (2013.01); *B29K 2105/06* (2013.01); *B29K 2307/04* (2013.01); *B29L 2031/3076* (2013.01); *B33Y 10/00* (2014.12); *B33Y 30/00* (2014.12)

(58) Field of Classification Search
  CPC .......... B33Y 30/00; B29K 2063/00; B29K 2105/06; B29K 2307/04; B29L 2031/3076
  USPC ........................................ 264/148
  See application file for complete search history.

(56) References Cited

U.S. PATENT DOCUMENTS

| | | |
|---|---|---|
| 9,126,367 B1 | 9/2015 | Mark et al. |
| 9,149,988 B2 | 10/2015 | Mark et al. |
| 9,156,205 B2 | 10/2015 | Mark et al. |
| 9,156,240 B2 | 10/2015 | Bertrand et al. |
| 9,186,846 B1 | 11/2015 | Mark et al. |
| 9,186,848 B2 | 11/2015 | Mark et al. |
| 9,421,565 B2 | 8/2016 | Lewis et al. |
| 2017/0028628 A1 | 2/2017 | Evans et al. |
| 2017/0274585 A1 | 9/2017 | Armijo et al. |
| 2017/0341300 A1 | 11/2017 | Rudolph et al. |
| 2017/0355138 A1 | 12/2017 | Mark |

* cited by examiner

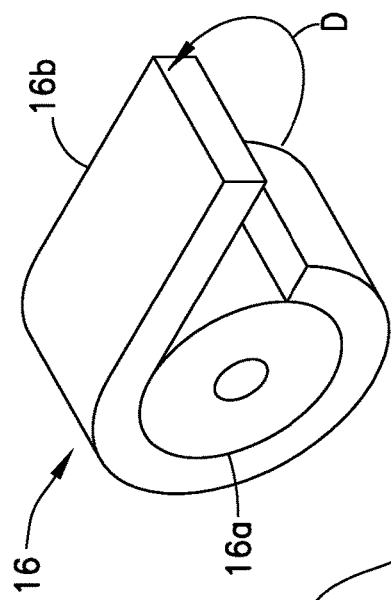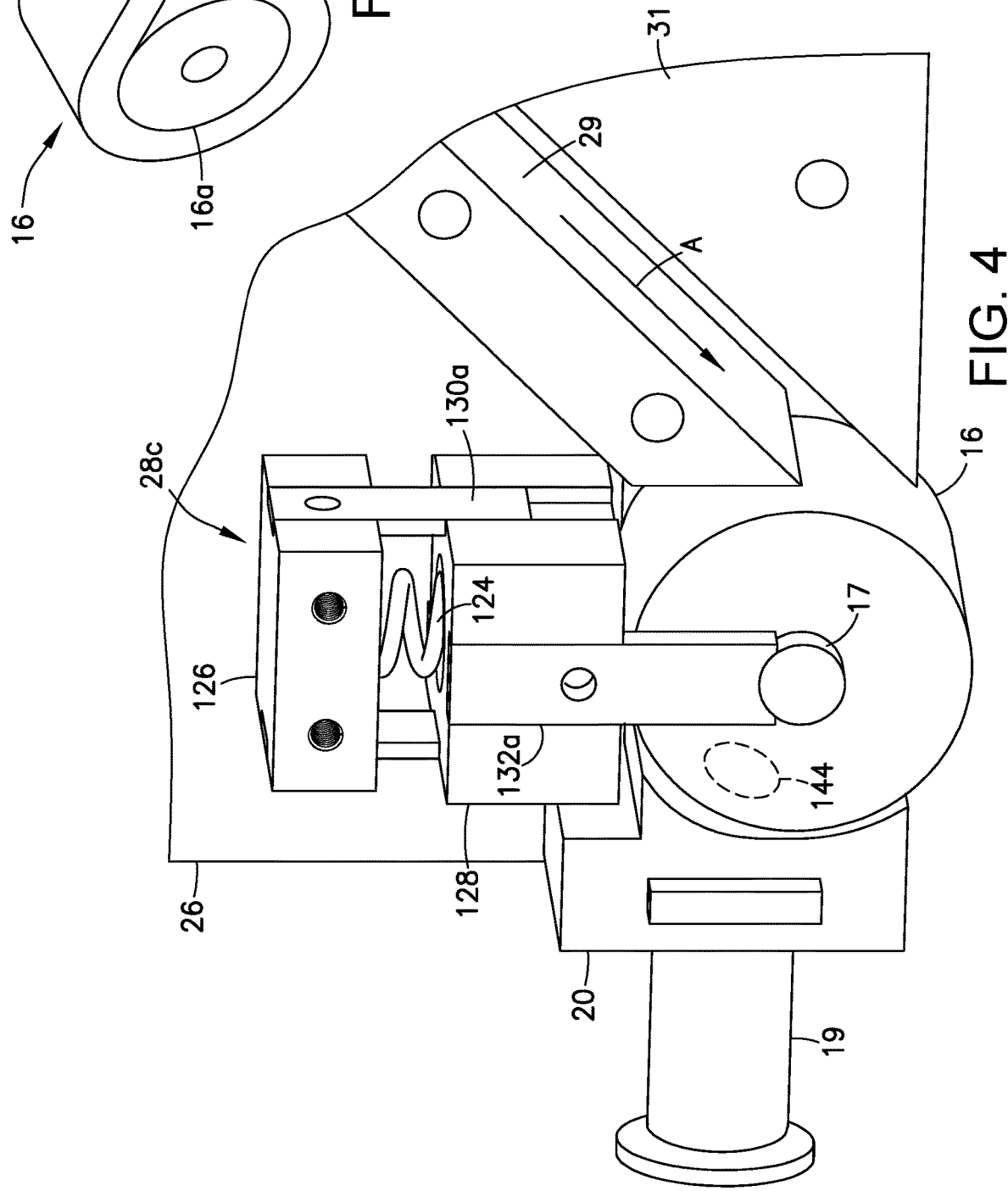

THREE-DIMENSIONAL PRINTING OF COMPOSITE REPAIR PATCHES AND STRUCTURES

BACKGROUND

The present disclosure generally relates to techniques for reworking areas of a structure made of composite material (e.g., carbon fiber-reinforced plastic (CFRP)), and more particularly relates to automated production and installation of patches used to rework areas of such a structure.

Composite structures sometimes include localized areas that may not conform to product and/or performance specifications, for any of a variety of reasons. Localized non-conformities may be reduced or eliminated by reworking (including repairing) the structure. The rework/repair process may involve removing one or more layers of material from the structure and then replacing the removed material with a composite patch that is bonded to the structure.

For the CFRP repair process, it is typical to apply a hand layup of tailored carbon fibers and epoxy resin (hereinafter "epoxy") to form a repair patch on the damaged spot or area after the latter has been scarfed, for example, by grinding or machining. This typical method of fabricating a composite patch is time consuming and labor intensive.

SUMMARY

The subject matter disclosed herein is directed to methods and apparatus for automating the fiber laying process during the repair of composite structures made of fiber-reinforced plastic material based on the three-dimensional (3-D) printing technique (also known as additive manufacturing). As used herein, the terms "3-D printing" and "additive manufacturing" are used synonymously to refer to processes in which material is joined or solidified under computer control to create a three-dimensional object, with material being added together. The main advantage of the 3-D printing methodology disclosed in some detail below is that continuous fiber rovings (e.g., carbon fibers) impregnated with a liquid epoxy-hardener mixture can be directly printed onto the damaged surface of the composite structure (e.g., an aircraft component made of carbon fiber-reinforced plastic (CFRP)) without human manipulation in an autonomous manner.

In accordance with some embodiments, the apparatus comprises a portable printing device that is easy to handle and applicable to a variety of complex surfaces. In accordance with other embodiments, the printing device can be mounted to an end effector of a robot. As an example of materials, a continuous dry carbon fiber roving and epoxy with hardener can be applied to a composite layer made of CFRP by means of a specially designed printer head. The epoxy is applied on the dry carbon fiber roving during the fiber feeding process, and then the wet fiber roving is printed directly on the target surface. The apparatus can also be used to print epoxy-impregnated fibers made of materials other than carbon.

The advantages of an automated process for 3-D printing of composite repair patches include at least the following: (1) uniform and controlled quality of the repaired composite; and (2) a rapid layup process for composite repair (reducing process time).

The embodiments disclosed in some detail below provide a method of reworking and/or repairing a structure, such as a composite laminate, using a composite laminate rework/repair patch produced by additive manufacturing under computer control. Automated production of the rework/repair patch reduces hand labor and the opportunity for human error in cutting, measuring, aligning and installing the patch. Automated production of the patch may increase dimensional control of patch features, leading to improved fitment and alignment with the structure being reworked. Automated production of the patch is based on a set of the digital data representing a 3-D map of the area being reworked/repaired, and results in a rework/repair patch having a shape, orientation and dimensions that precisely match the topography of the rework/repair area.

Although various embodiments of apparatus and methods for automating the fiber laying process during the repair of composite structures will be described in some detail below, one or more of those embodiments may be characterized by one or more of the following aspects.

One aspect of the subject matter disclosed in detail below is a method for adding composite material to a composite structure, comprising continuously laying down successive portions of a continuous fiber roving on the composite structure while wetting each successive portion with epoxy-hardener mixture in a liquid state. This method may further comprise: cutting the dry fiber roving to establish a length of fiber roving to be laid; and allowing the epoxy-hardener mixture on the length of fiber roving to cure in place on the composite structure at ambient temperature. The dry fiber roving is a continuous bundle of unidirectional (i.e., generally parallel, non-twisted and non-entangled) reinforcement fibers (e.g., carbon fibers). The method further comprises: mixing liquid epoxy and liquid hardener in a mixer to form the epoxy-hardener mixture; feeding epoxy-hardener mixture from the mixer to a printing roller; and transferring epoxy-hardener mixture from the printing roller to the dry fiber roving.

In accordance with some embodiments, the method described in the preceding paragraph further comprises absorbing epoxy-hardener mixture in a mixture-absorbing layer of the printing roller, wherein each successive portion of the fiber roving passes through a nip formed by the printing roller and the composite structure with epoxy-hardener mixture that has desorbed from the mixture-absorbing layer of the printing roller.

Another aspect of the subject matter disclosed in detail below is a method for adding composite material to a composite structure, comprising: (a) placing a printing roller adjacent to a first area of the composite structure to form a nip therebetween; (b) transferring an epoxy-hardener mixture in a liquid state onto the printing roller; (c) rotating the printing roller; (d) feeding a dry fiber roving through the nip; (e) transferring epoxy-hardener mixture from the printing roller to a portion of the dry fiber roving that is passing through the nip; and (f) pressing the portion of the fiber roving with transferred epoxy-hardener mixture on the composite structure, wherein steps (d) through (f) are performed while the printing roller is rotating. In accordance with one proposed implementation, step (b) comprises absorbing epoxy-hardener mixture in a mixture-absorbing layer of the printing roller and step (e) comprises wetting the portion of the fiber roving that is passing through the nip with epoxy-hardener mixture that has desorbed from the mixture-absorbing layer of the printing roller. The method may further comprise attaching the mixture-absorbing layer of the printing roller around a periphery of a roller core (made of non-mixture-absorbing material) of the printing roller.

A further aspect of the subject matter disclosed in detail below is an apparatus for adding composite material to a composite structure, comprising: a mixer for mixing liquid ingredients contained therein; tubing having one end in fluid communication with the mixer for receiving a liquid mixture from the mixer; a dry fiber roll having a dry fiber roving wound thereon; a printer head comprising a printing roller, a fiber guide configured to guide successive portions of dry fiber roving paid out from the dry fiber roll toward the printing roller, and a fitting in fluid communication with another end of the tubing for receiving liquid mixture therefrom and having an opening adjacent to the printing roller that enables liquid mixture to flow onto the printing roller.

In accordance with some embodiments of the apparatus described in the preceding paragraph, the printing roller comprises a roller core having a periphery and a mixture-absorbing layer attached to the periphery of the roller core. In accordance with one proposed implementation, the mixture-absorbing layer of the printing roller is made of a bleeder material, such as fiberglass or polyester woven fabric.

Other aspects of apparatus and methods for automating the fiber laying process during the repair of composite structures are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 4 is a diagram representing a magnified view of the printing roller and associated compliant linear guide that are parts of the printer head depicted in FIG. 3.

FIG. 4A is a diagram representing a view of the printing roller depicted in FIG. 4 in isolation and with an outer epoxy-absorbing layer partly peeled away from the roller core.

Reference will hereinafter be made to the drawings in which similar elements in different drawings bear the same reference numerals.

DETAILED DESCRIPTION

The embodiments disclosed in some detail below relate to a method of reworking and/or repairing an area of a composite structure in order to reduce or eliminate non-conformities in the structure and/or to change physical characteristics of localized areas of the structure. For ease of the following description, the terms "rework" and "reworking" are intended to include repairs made to areas of the composite structure.

Illustrative embodiments of apparatus, systems and methods for reworking composite structures made of fiber-reinforced plastic material are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
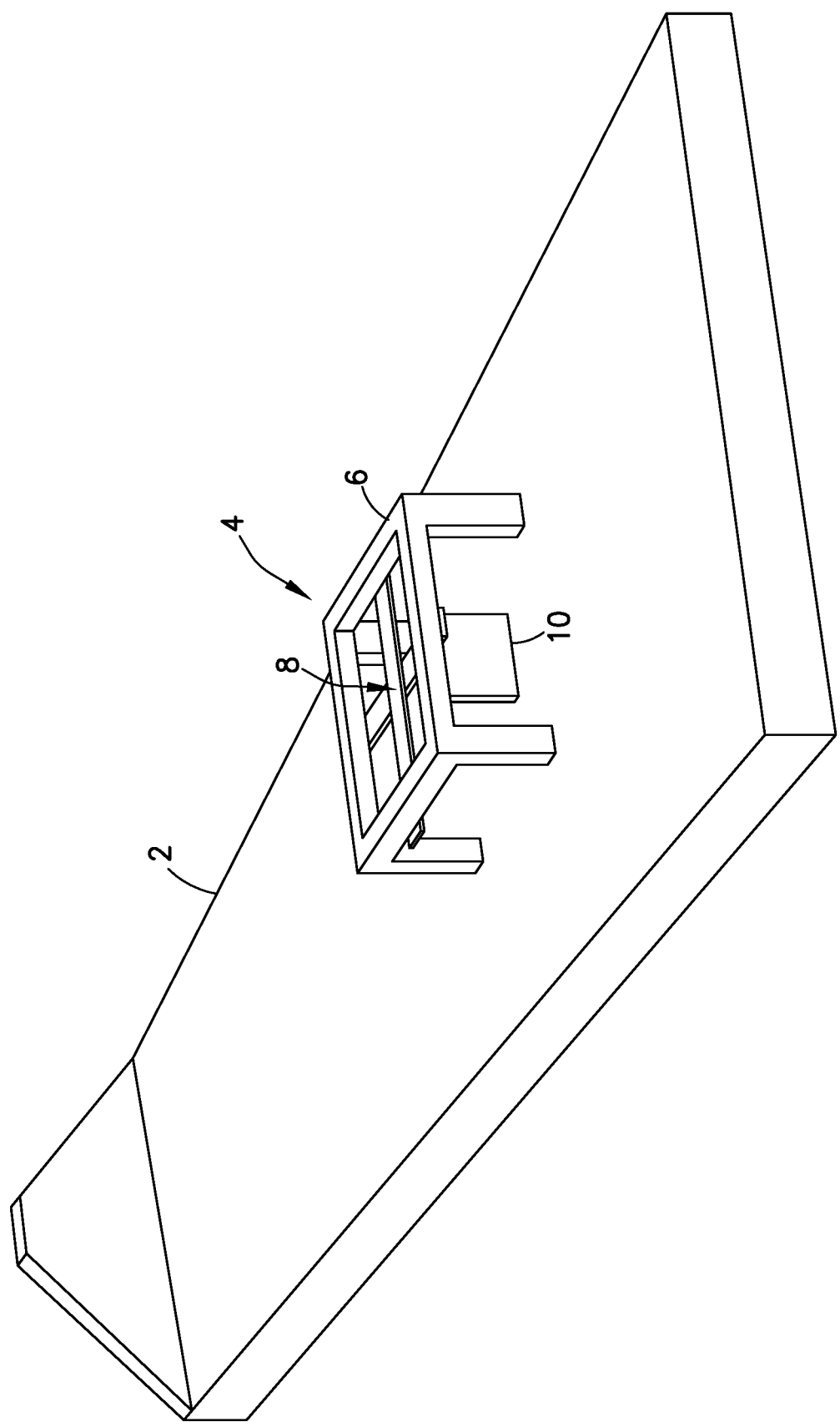
FIG. 1 is a diagram representing a view of a portable 3-D printing apparatus placed on a surface of a composite structure.

FIG. 1 is a diagram representing a view of a portable 3-D printer 4 in accordance with one embodiment. The printer 4 is shown placed on a surface of a composite structure 2. The printer 4 comprises a frame 6 that supports a multi-axis positioner 8 in a position overlying an area on the composite structure 2 to be reworked (e.g., a repair site). Although the frame 6 is shown as having four legs, a frame having only three legs could be employed. The multi-axis positioner 8 in turn supports and positions a printer head 10. The multi-axis positioner 8 has a controller (not shown in FIG. 1) that can be configured (i.e., programmed) to move the printer head 10 across the surface of the composite structure 2 while the printer head 10 prints epoxy-impregnated fibers (e.g., carbon fibers) on the area to be reworked.

Figure 2:
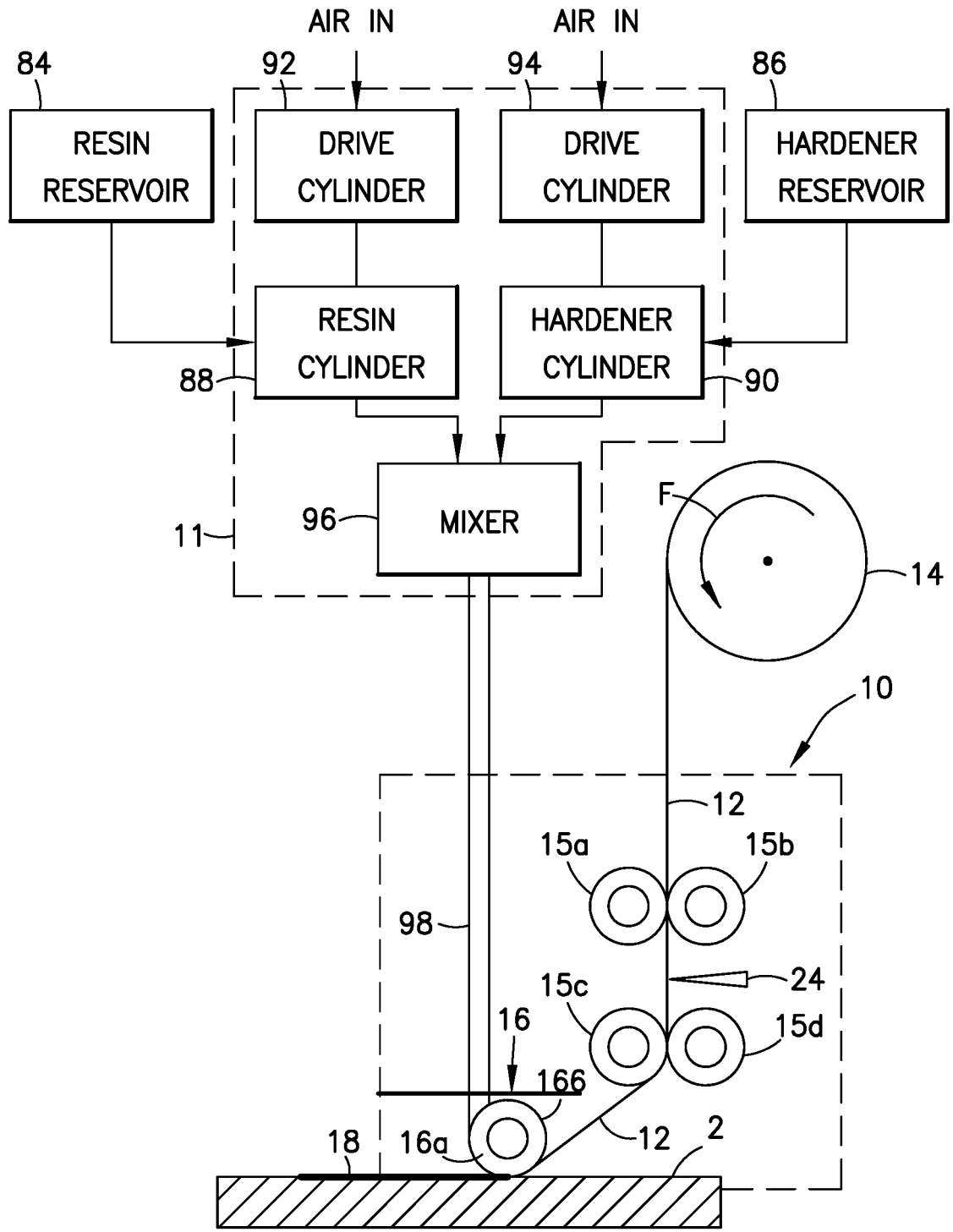
FIG. 2 is a hybrid diagram identifying some components of a 3-D printing apparatus in accordance with one embodiment, including a pneumatic dispenser (represented by a block diagram), a dry fiber roll and a printer head (represented by a schematic diagram).

FIG. 2 is a hybrid diagram identifying some components of a 3-D printing apparatus in accordance with one embodiment. The apparatus partly depicted in FIG. 2 comprises a printer head 10, a pneumatic dispenser 11 that dispenses a liquid epoxy-hardener mixture to the printer head 10, and a dry fiber roll 14 that supplies a continuous dry fiber roving 12 to the printer head 10. As used herein, the term "fiber roving" should be construed broadly to mean a continuous bundle of unidirectional reinforcement fibers (e.g., carbon fibers). As used herein, the term "unidirectional" means generally parallel, non-twisted and non-entangled.

The mechanisms incorporated in the printer head 10 include: (1) a first pair of fiber feeding rollers 15a and 15b that form a first nip through which the paid-out portion of the dry fiber roving 12 passes; (2) a second pair of fiber feeding rollers 15c and 15d that form a second nip through which the dry fiber roving 12 passes; (3) a high-hardness cutter 24 which is disposed between the first and second pairs of fiber feeding rollers 15a-15d and which is activatable to cut the dry fiber roving 12; and (4) a printing roller 16 that contacts the surface of the composite structure 2 to form a third nip through which the dry fiber roving 12 passes. The dry fiber roving 12 is fed to the third nip by the fiber feeding rollers 15a-15d, which pull the dry fiber roving 12, causing the dry fiber roll 14 to rotate in the direction indicated by arrow F in FIG. 2. The two pairs of fiber feeding rollers 15a-15d should be controlled independently to provide tension in the dry fiber roving 12 during cutting. In accordance with one proposed implementation, rollers 15b and 15d are driven by respective servo motors (not shown in FIG. 2). In accordance with one proposed implementation, the fiber feeding rollers 15a-15d are made of urethane.

Still referring to FIG. 2, the pneumatic dispenser 11 comprises: (1) a resin cylinder 88 having a piston inside; (2) a drive cylinder 92 having a piston inside which is mechanically linked to the piston inside the resin cylinder 88; (3) a hardener cylinder 90 having a piston inside; (4) a drive cylinder 94 having a piston inside which is mechanically linked to the piston inside the hardener cylinder 90; and (5) a mixer 96 that has a first port for receiving a metered amount of epoxy resin from the resin cylinder 88 when pressurized air is input to the drive cylinder 92 and a second port for receiving a metered amount of hardener from the hardener cylinder 90 when pressurized air is input to the drive cylinder 94. The resin cylinder 88 is supplied with liquid epoxy resin from a resin reservoir 84, while the hardener cylinder 90 is supplied with liquid hardener from a hardener reservoir 86. The mixer 96 mixes the liquid ingredients received from the resin cylinder 88 and the hardener cylinder 90 and then dispenses the resulting liquid epoxy-hardener mixture to the printing roller 16 by way of tubing 98.

While one embodiment of a meter/mix/dispense system is schematically depicted in FIG. 2, it should be appreciated that many other types of meter/mix/dispense systems may be used. Most meter/mix/dispense systems perform essentially the same functions: they meter out precise amounts of each ingredient, mix them, and then dispense the mixture via positive displacement, meaning material is dispensed either by moving a piston or rod or by rotating an auger or gear, onto a surface. In a fixed-mix-ratio system, the metered volume may be determined by the displacement of the cylinder used for each ingredient. The cylinders are mechanically linked and actuated by a pneumatic drive, with discrete volumes dispensed one at a time. The mixer 90 is preferably a dynamic mixer have a rotating blade or screw inside a chamber.

The liquid epoxy-hardener mixture received from the mixer 96 is applied on the dry fiber roving 12 by the printing roller 16. The printing roller 16 comprises a roller core 16a having a periphery and a mixture-absorbing layer 16b attached to the periphery of the roller core 16a. The mixture-absorbing layer 16b of the printing roller 16 absorbs the epoxy-hardener mixture and then carries it to the third nip where the epoxy-hardener mixture is desorbed onto the dry fiber roving 12. The resulting wet fiber roving 18 is then printed directly on the surface of the composite structure 2.

As used herein, the term "epoxy" refers to a class of reactive prepolymers and polymers which contain epoxide groups. Epoxies may be reacted (cross-linked) either with themselves through catalytic homopolymerization, or with a wide range of co-reactants including polyfunctional amines, acids (and acid anhydrides), phenols, alcohols and thiols. These co-reactants are often referred to as hardeners or curatives, and the cross-linking reaction is commonly referred to as curing. Reaction of polyepoxides with themselves or with polyfunctional hardeners forms a thermosetting polymer, often with high mechanical properties, temperature and chemical resistance. The type of epoxy can be changed according to desired mechanical properties or curing time.

Figure 3:
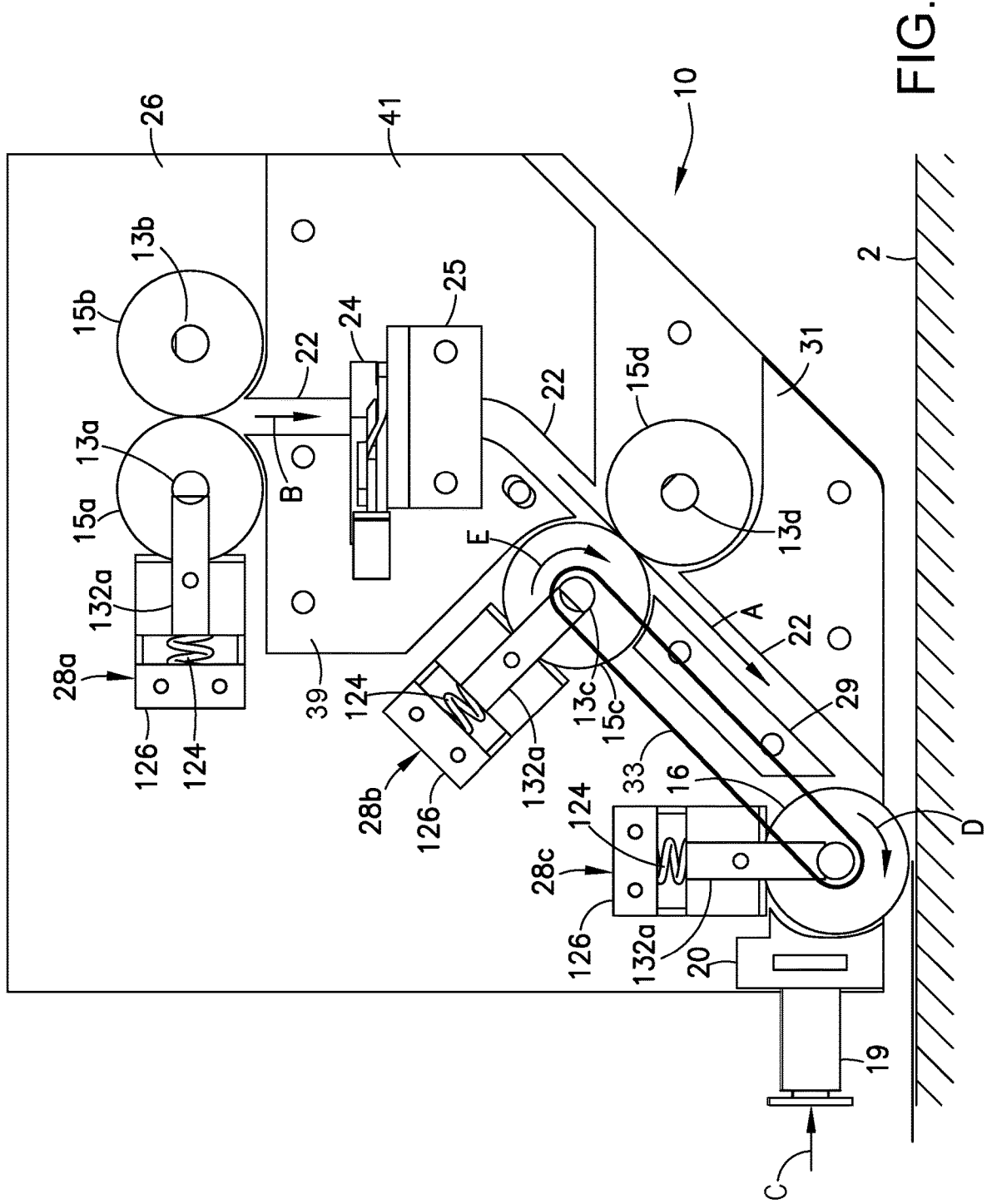
FIG. 3 is a diagram representing an elevational view of a printer head in accordance with one embodiment with a front plate removed to reveal components that would be otherwise hidden.

FIG. 3 is a diagram representing an elevational view of a printer head 10 in accordance with one embodiment with a front plate (see front plate 27 in FIG. 5) removed to reveal components that would be otherwise hidden. Most of the components depicted in FIG. 3 are disposed between and supported by the front plate 27 and the back plate 26, which may be mutually parallel planar plates made of metallic alloy such as steel.

The printer head 10 comprises a printing roller 16, a fiber guide 22 configured to guide successive portions of dry fiber roving 12 paid out from the dry fiber roll 14 toward the printing roller 16, and a fitting 20 having a tube connector 19 in fluid communication with one end of the tubing 98 (shown in FIG. 2) for receiving the liquid epoxy-hardener mixture therefrom and having an opening (not shown in FIG. 3, but see opening 144 in FIG. 4) adjacent to the printing roller 16 that enables the epoxy-hardener mixture to flow onto the printing roller 16. The printing roller 16, fiber guide 22 and fitting 20 are all disposed between (at least in part) and supported by the front and back plates 27 and 26.

The printing roller 16 is rotatably mounted to an axle 17 having opposing ends fixedly coupled to the front and back plates 27 and 26. A portion of the printing roller 16 projects beyond the bottom edges of front and back plates 27 and 26, which allows the printing roller 16 to contact the surface of the composite structure 2 and form a nip therebetween. A continuous dry fiber roving 12 (not shown in FIG. 3) is fed to the nip by the first pair of fiber feeding rollers 15a and 15b and by the second pair of fiber feeding rollers 15c and 15d, which are rotatably mounted to respective axles 13a-13d having opposing ends fixedly coupled to the front and back plates 27 and 26. Accordingly, the fiber feeding rollers 15a-15d are disposed between the front and back plates 27 and 26.

The continuous dry fiber roving 12 is fed to the nip between the printing roller 16 and the surface of the composite structure 2 by way of a fiber guide 22, which is disposed between and fixedly coupled to the front and back plates 27 and 26. The fiber guide 22 comprises: a first portion formed by a first pair of fiber guides 39 and 41, which first portion of fiber guide 22 is disposed between the nips formed by fiber feeding rollers 15a-15d; and a second portion formed by a second pair of fiber guides 29 and 31, which second portion of fiber guide 22 is disposed between the nip formed by fiber feeding rollers 15c and 15d and the nip formed by the printing roller 16 and the surface of the composite structure 2.

The fiber feeding roller 15a is pressed against the fiber feeding roller 15b by a compliant linear guide 28a, while the fiber feeding roller 15c is pressed against the fiber feeding roller 15d by a compliant linear guide 28b. Similarly, the printing roller 16 is pressed against the composite structure 2 by a compliant linear guide 28c. All of the compliant linear guides 28a-28c preferably have the identical structure, which will be described in some detail hereinafter with reference to FIG. 4B.

Figure 5:
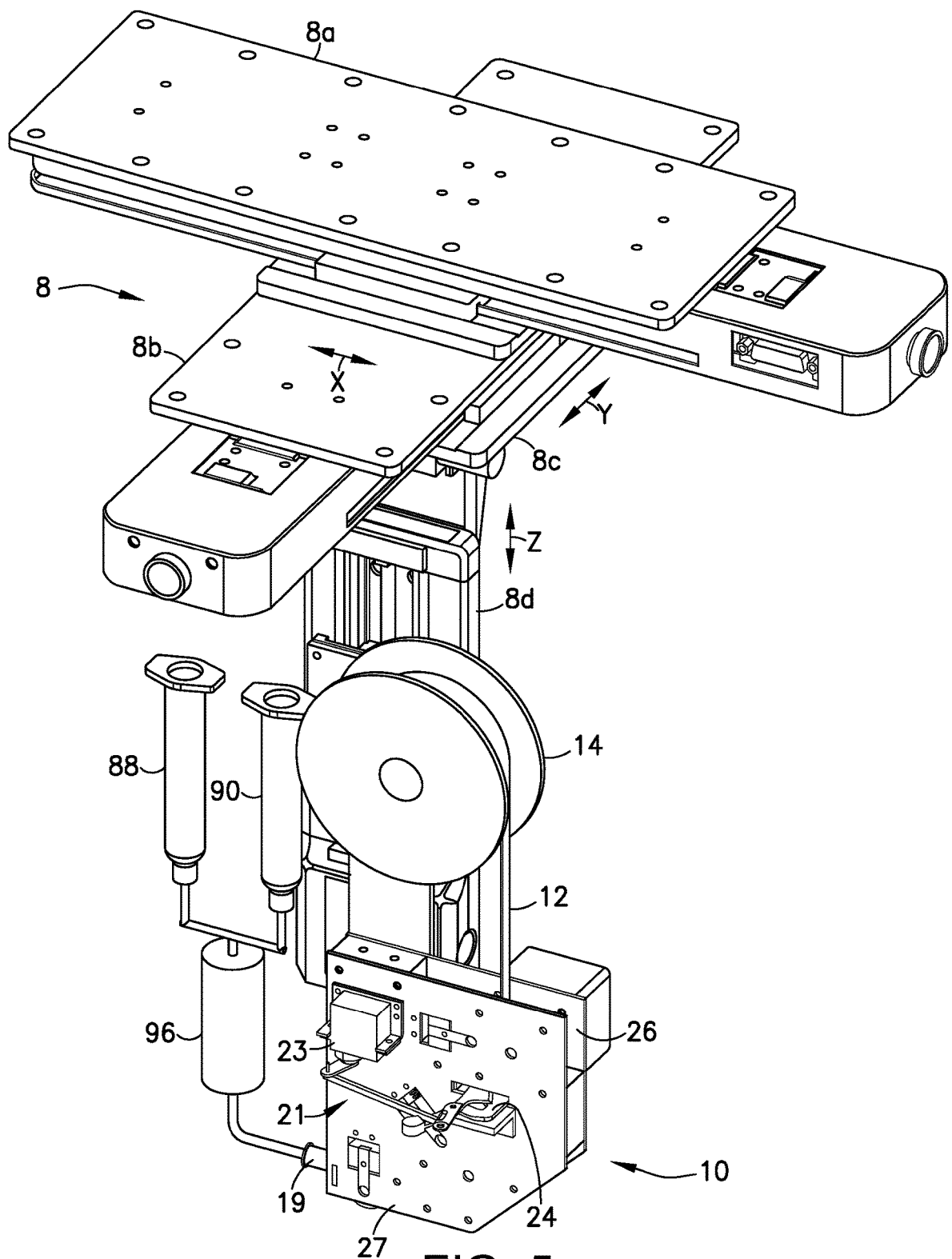
FIG. 5 is a diagram representing an orthographic view of a 3-D printing system for printing composite repair patches having a multi-axis positioner in accordance with one embodiment.

As seen in FIG. 3, the printer head 10 further comprises a cutter 24 supported on a cutter mounting plate 25 that is fixedly coupled to the front plate 27 (not shown in FIG. 3). As seen in FIG. 5, the cutter mounting plate 25 is not disposed between the front and back plates 27 and 26, while the cutter extends into the space between the front and back plates 27 and 26 in order to be able to engage the dry fiber roving 12 (not shown in FIG. 3) being fed through the fiber guide 22. The cutter 24 is selectively activated for cutting the continuous dry fiber roving when a printing path is approaching its end. The autonomous cutting operation can be manipulated by a cutter motor (not shown in FIG. 3, but see cutter motor 23 in FIG. 5).

The feed path of the dry fiber roving 12 is indicated by arrows A and B in FIG. 3, while the flow of epoxy-hardener mixture into the tube connector 19 of fitting 20 is indicated by arrow C. The rotation of the printing roller 16 during a printing operation is indicated by arrow D in FIG. 3. In accordance with one proposed implementation, the printing roller 16 is coupled to rotate in synchronism with the passive fiber feeding roller 15c by a timing belt 33. The passive fiber feeding roller 15c in turn is driven to rotate by its contact with the motor-driven fiber feeding roller 15d. In alternative embodiments, rotation of the printing roller 16 could be driven independently by its own motor (see, e.g., printing roller motor 166 in FIG. 8), so long as the printing roller 16 and fiber feeding roller 15d rotate at the same speed. During its rotation, the printing roller 16 applies a uniform amount of epoxy-hardener mixture to the dry fiber roving 12. Due to the pressure exerted on the composite structure 2 by the printing roller 12, the epoxy-hardener mixture is applied to the dry fiber roving 12 just before it is printed onto the composite structure 2.

Figure 4B:
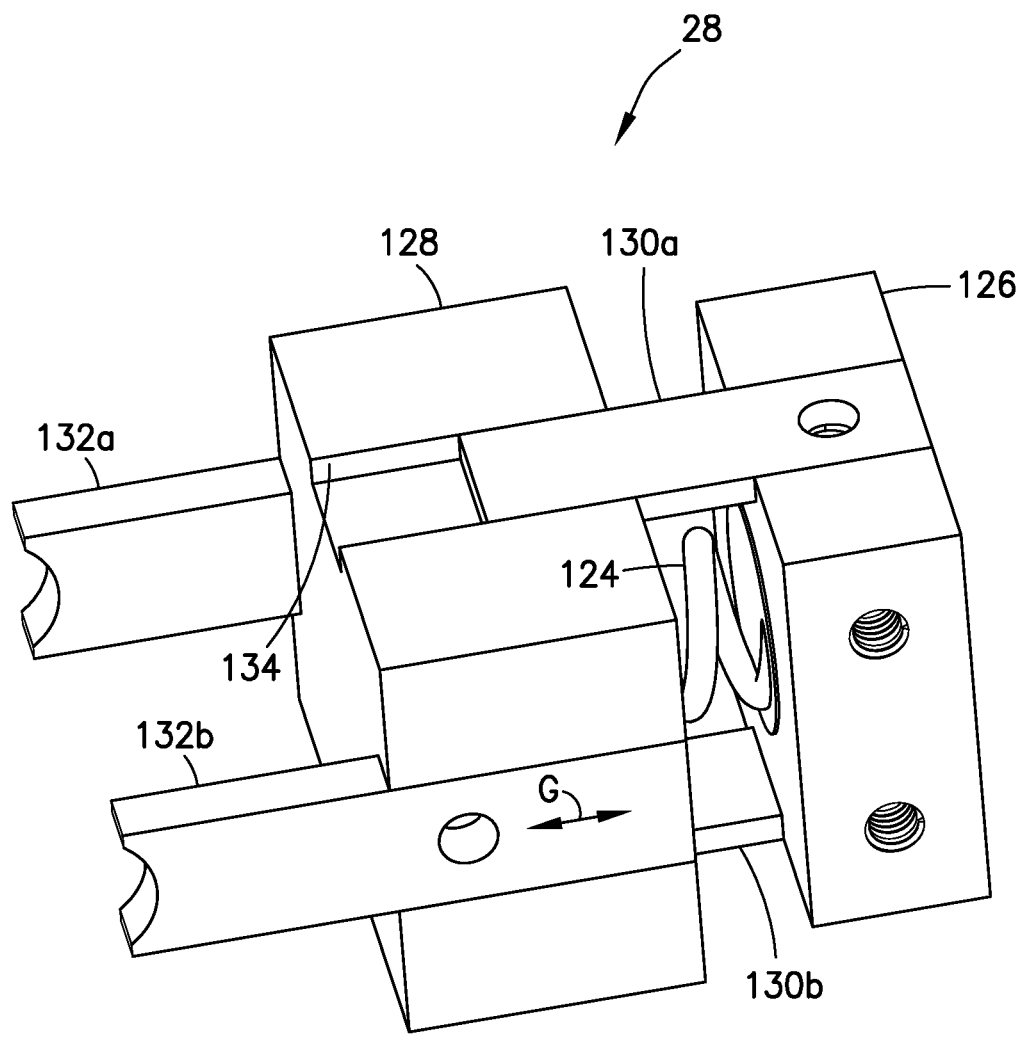
FIG. 4B is a diagram representing a view of the compliant linear guide depicted in FIG. 4 in isolation.

FIG. 4 is a diagram representing a magnified view of the printing roller 16 and associated compliant linear guide 28c that are parts of the printer head 10 depicted in FIG. 3. FIG. 4A shows a view of the compliant linear guide 28c in isolation. FIG. 4B shows the printing roller 16 in isolation.

As shown in FIG. 4A, the printing roller 16 comprises a roller core 16a (e.g., made of metallic alloy) having a periphery and a mixture-absorbing layer 16b attached to the periphery of the roller core 16a. The mixture-absorbing layer 16b of the printing roller 16 is preferably made of a disposable bleeder material, such as fiberglass or polyester woven fabric. One type of glass fiber used in fiberglass is E-glass, which is alumino-borosilicate glass with less than 1% w/w alkali oxides.

The mixture-absorbing layer 16b contains the dispensed epoxy-hardener mixture and applies uniform amounts to the dry fiber roving 12. As the dry fiber roving 12 meets the composite substrate, the wet mixture-absorbing layer 16b presses the dry fiber roving 12 to the substrate. In this process, epoxy is uniformly applied to the dry fiber roving 12 and the wet fiber roving 18 (see FIG. 2) is attached to the substrate or the previous fiber layer. The feeding of the epoxy-hardener mixture is not continuous, since the mixture-absorbing layer 16b can store a certain amount without additional feeding. After the printing is finished, the mixture-absorbing layer 16b can be peeled off for re-use as shown in FIG. 4A.

FIG. 4B shows components of a generic compliant linear guide 28. Each of the compliant linear guides 28a-28c incorporated in the embodiment depicted in FIG. 3 has the structure shown in FIG. 4B. The linear guide 28 comprises a base 126 which is disposed between and fixedly coupled to the front and back plates. The base 126 supports one end of each of a pair of dovetail rails 130a, 130b. The other ends of dovetail rails 130a, 130b are slidably coupled to a pair of dovetail channels 134 formed on opposing side of a carriage 128. The carriage 128 in turn supports a pair of roller support arms 132a, 132b. The distal ends of the roller support arms 132a, 132b will be fixedly coupled to opposing ends of an axle. More specifically, the distal ends of the roller support arms 132a, 132b of compliant linear guide 28a are attached to opposing ends of axle 13a; the distal ends of the roller support arms 132a, 132b of compliant linear guide 28b are attached to opposing ends of axle 13b; and the distal ends of the roller support arms 132a, 132b of compliant linear guide 28c are attached to opposing ends of axle 17.

Figure 6:
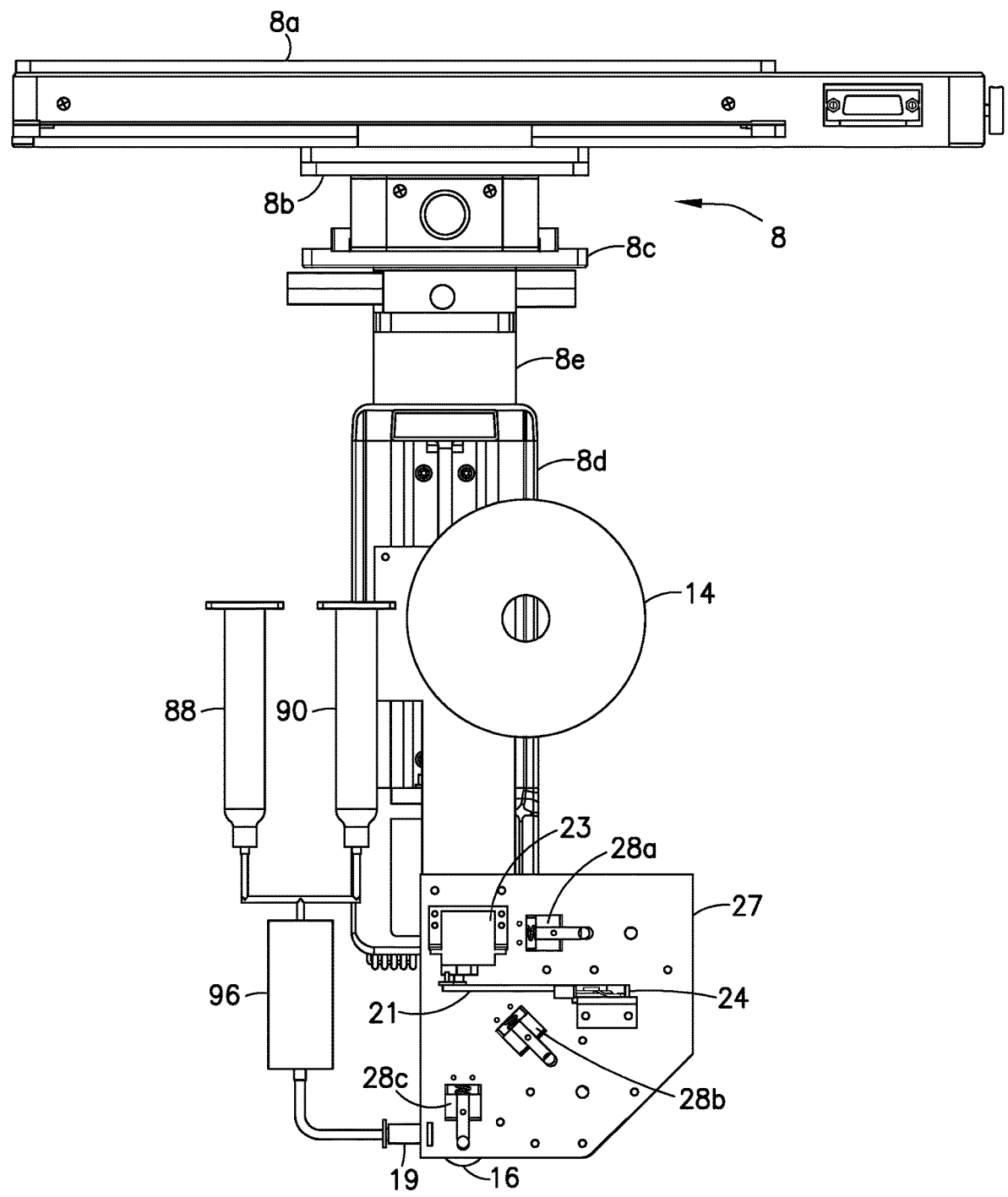
FIG. 6 is a diagram representing a front elevational view of the 3-D printing system depicted in FIG. 5.
Figure 7:
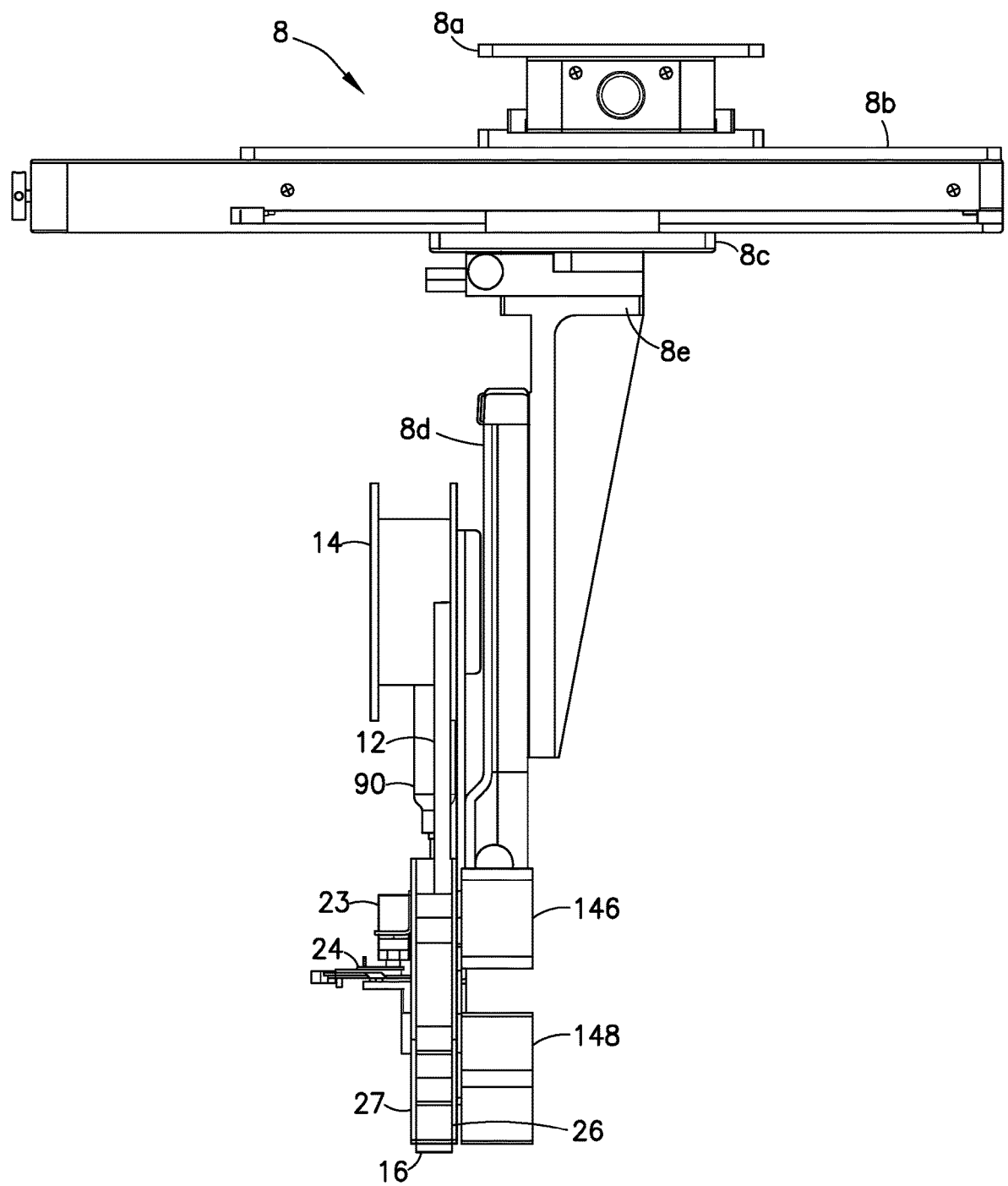
FIG. 7 is a diagram representing a side elevational view of the 3-D printing system depicted in FIG. 5.

FIG. 5 is a diagram representing an orthographic view of a 3-D printing system for printing composite repair patches having a multi-axis positioner 8 in accordance with one embodiment. FIGS. 6 and 7 show front and side elevational views respectively of the 3-D printing system depicted in FIG. 5. The multi-axis positioner 8 is designed based on the required motion for the target surface's complexity, and it controls the movement of the printer head 10.

The multi-axis positioner 8 depicted in FIGS. 5-7 comprises a mounting stage 8a and an X-axis linear stage 8b translatably coupled to the mounting stage 8a for translation in either direction along an X-axis. These X-axis translations are indicated by the double-headed arrow X in FIG. 4. The multi-axis positioner 8 further comprises a Y-axis linear stage 8c translatably coupled to the X-axis linear stage 8b for translation in either direction along a Y-axis. These Y-axis translations are indicated by the double-headed arrow Y in FIG. 4. The multi-axis positioner 8 further comprises a Z-axis rotation stage 8e which is rotatably coupled to the Y-axis linear stage 8c for rotation in either direction about the Z-axis. Lastly, the multi-axis positioner 8 further comprises a Z-axis linear stage 8d which is translatably coupled to the Z-axis rotation stage 8e for translation in either direction along a Z-axis. These Z-axis translations are indicated by the double-headed arrow Z in FIG. 4.

The printer head 10, dry fiber roll 14 and pneumatic dispenser 11 (including resin cylinder 88, hardener cylinder 90 and mixer 96 depicted in FIGS. 5 and 6) are mounted to the Z-axis linear stage 8d. Accordingly, the printer head 10 can be translated in the X, Y and Z directions and rotated about the Z-axis by operation of the multi-axis positioner 8 under the control of a computer system in a well-known manner.

As shown in FIG. 5, the cutter 24 is coupled to a cutter motor 23 (e.g., a servo motor) by way of a linkage 21. The cutter motor is mounted to the front face of the front plate 27, as is the cutter mounting plate 25. As seen in FIG. 6, the printing roller 16 projects beyond the lower edges of the front and back plates 27 and 26, allowing the printing roller 16 to contact and roll along a surface of a composite substrate. As best seen in FIG. 7 the fiber feeding roller motors 146 and 148 (e.g., servo motors), which respectively drive rotation of fiber feeding rollers 15*b* and 15*d* (see FIG. 3), are mounted to the back surface of the back plate 26.

Figure 8:
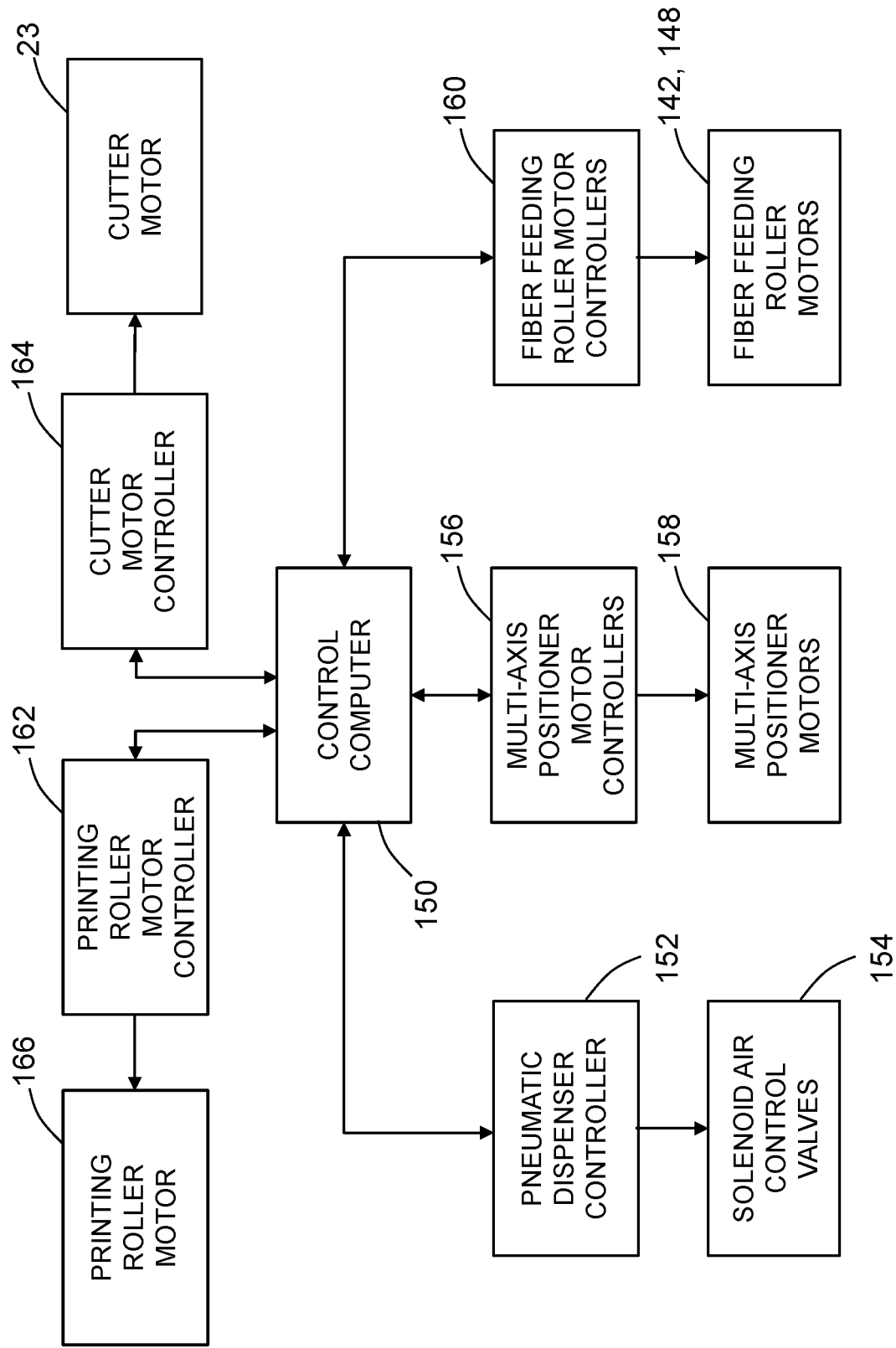
FIG. 8 is a block diagram identifying some components of a 3-D printing apparatus in accordance with one embodiment.

FIG. 8 is a block diagram identifying other components of a 3-D printing apparatus in accordance with one embodiment. These components can be used in conjunction with the apparatus depicted in FIGS. 5-7. The 3-D printing apparatus comprises a control computer 150 which is configured to control the operation of the 3-D printing apparatus during the automated additive manufacturing of a composite repair patch.

The control computer 150 communicates with four multi-axis stage motor controllers 156, which multi-axis stage motor controllers 156 in turn control the operation of four multi-axis stage motors 158. Three of the multi-axis stage motors drive translation of the X-, Y- and Z-axis linear stages 8*b*-8*d*, while the fourth multi-axis stage motor drives rotation of the Z-axis rotation stage 8*e*. The control computer 150 is also configured to communicate with a cutter motor controller 164, which cutter motor controller 164 in turn controls the operation of cutter 24.

The control computer 150 also communicates with a pneumatic dispenser controller 152 which is configured to output electrical control signals for controlling the states of a pair of solenoid air control valves 154. The states of the solenoid air control valves 154 respectively determine how much pressurized air is supplied to the drive cylinders 92 and 94 identified in FIG. 2.

The control computer 150 also communicates with a pair of fiber feeding roller motor controllers 160, which fiber feeding roller motor controllers 160 in turn control the operation of fiber feeding roller motors 146 and 148. The fiber feeding roller motor 146 drives rotation of the fiber feeding roller 15*b*, while the fiber feeding roller motor 148 drives rotation of the fiber feeding roller 15*d*. During feeding of the dry fiber roving 12, the fiber feeding roller motors 146 and 148 are controlled to rotate at the same speeds. During cutting of the dry fiber roving 12, the fiber feeding roller motor 146 can be controlled to reduce its rotational speed, thereby inducing a tension in the portion of the dry fiber roving 12 that spans the respective nips at the fiber feeding rollers 15*b* and 15*d* to facilitate cutting.

In accordance with a proposed implementation in which the printing roller 16 is driven to rotate by a printing roller motor 166 (instead of being coupled to a fiber feeding roller by a timing belt), the control computer 150 is also configured to communicate with a printing roller motor controller 162, which printing roller motor controller 162 in turn controls the rotation of the printing roller motor 166. More specifically, the control computer 150 is configured to cause the printing roller 16 and the fiber feeding rollers 15*b* and 15*d* to all rotate at the same speed.

Figure 9:
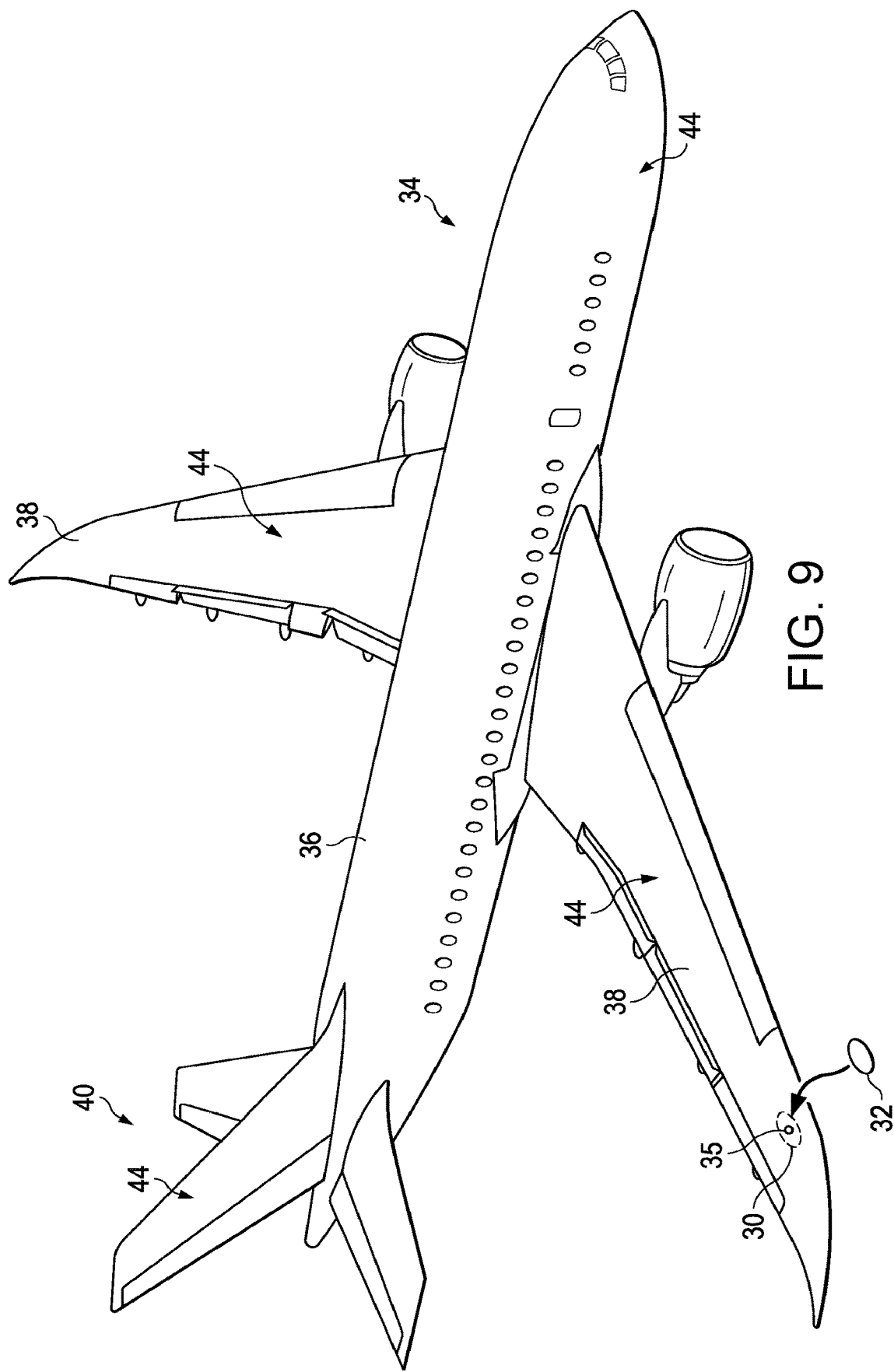
FIG. 9 is a diagram representing a view of an aircraft with a composite skin having an area requiring rework.

The portable additive manufacturing system described above can be used to repair damage to composite components of vehicles such as aircraft. For example, referring to FIG. 9, an aircraft 34 includes a fuselage 36, a pair of wings 38 and a tail assembly 40, all covered by the outer skin 44. The skin 44 may comprise a composite laminate structure, hereinafter sometimes simply referred to as a "structure", a "composite structure" or a "composite laminate". While the aircraft 34 is in service, events such as an impact on the skin 44 caused by any of various events, may result in the formation of one or more non-conformities 35 within an area 30 of the skin 44. In order to reduce or eliminate the non-conformities 35 in the area 30, hereinafter referred to as "rework area 30", is reworked and restored using a composite rework patch 32. As will be discussed later in more detail, this rework process involves removing material from the skin 44 within the rework area 30 and replacing the material that has been removed with the composite patch 32.

The disclosed method and rework patch 32 may also be employed to rework an area 30 of a composite structure 44 comprising a part that is in an intermediate stage of production, before it has been assembled and/or placed in service. For example, a composite barrel section of the fuselage 36 shown in FIG. 9 may contain one or more non-conformities within one or more areas that cause the barrel section to be outside of desired specifications. To bring the area within the desired specifications, material may be removed from the rework area and replaced by a bonded rework patch produced in accordance with the embodiments disclosed herein.

Figure 10:
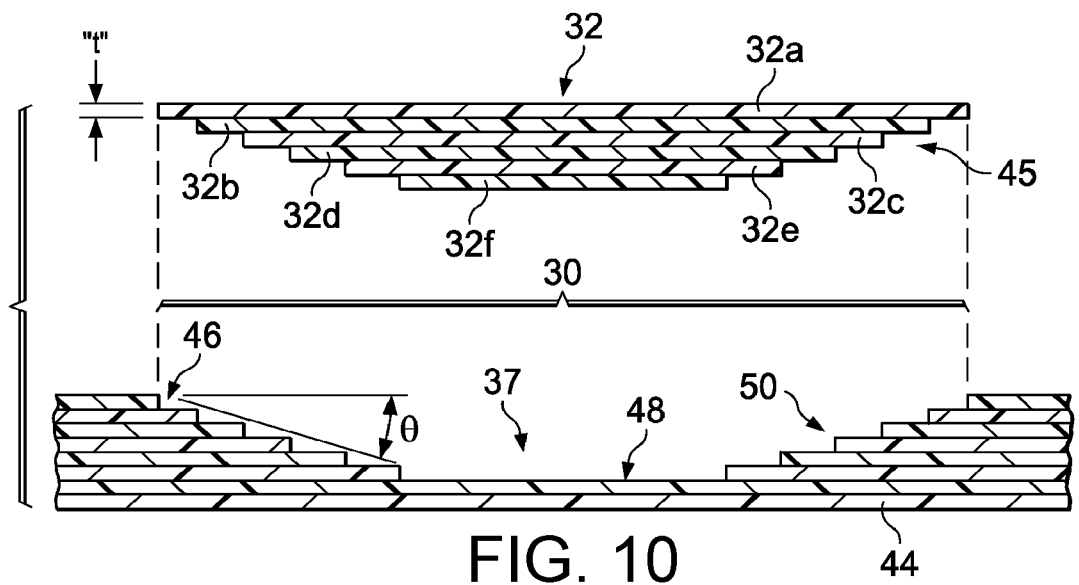
FIG. 10 is a diagram representing a cross-sectional view of an area of the composite skin requiring rework prior to the installation of a rework patch having stepped edges.
Figure 10A:
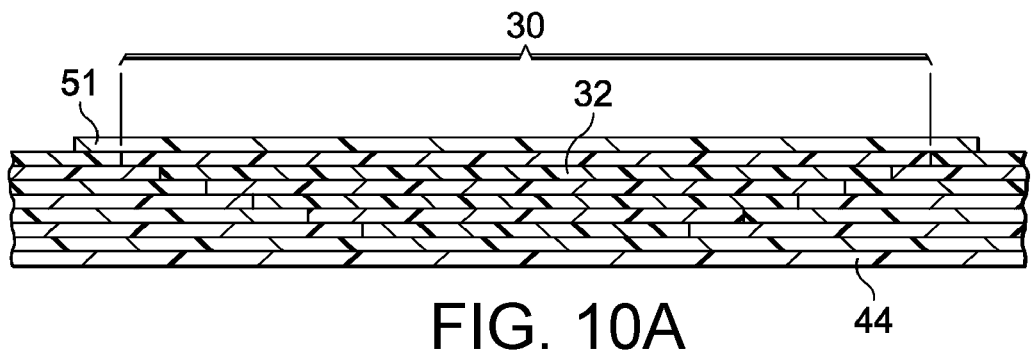
FIG. 10A is a diagram representing a cross-sectional view of an area of the composite skin requiring rework subsequent to the installation of a rework patch having stepped edges.

The rework area 30 may be restored using one form of the disclosed rework patch 32 shown in FIGS. 10 and 10A. In this example, material has been removed from a composite laminate composite structure 44, using any of several known techniques, leaving a cavity 37. The cavity 37 has an outer periphery 46, a substantially flat bottom 48 and a stepped edge 50. The stepped edge 50 may be tapered at any desired angle θ. The rework patch 32 comprises a plurality of reinforced laminated plies 32*a*-32*f* arranged with a stepped edge 45 matching the stepped edge 50 of the rework area 30. The thickness "t" and shape of each of the plies 32*a*-32*f* substantially match the thicknesses and shapes of the corresponding plies 49 of the laminate composite structure 44. Additionally, the plies 32*a*-32*f* may have differing ply orientations according to a predetermined ply schedule which may match the ply schedule of the composite laminate composite structure 44.

As shown in FIG. 10A, the rework patch 32 fills and substantially matches the topography and the orientation of the entire cavity 37. The nearly exact fitment between the rework patch 32 and the cavity 37 reduces the possibility of undesired voids or porosities at the interface between the rework patch 32 and the laminate composite structure 44, thereby improving the performance of the rework patch 32 and restoration of the rework area 30. Depending upon the particular application, one or more covering plies 51 may be bonded to the laminate composite structure 44, overlapping the rework patch 32.

Figure 11:
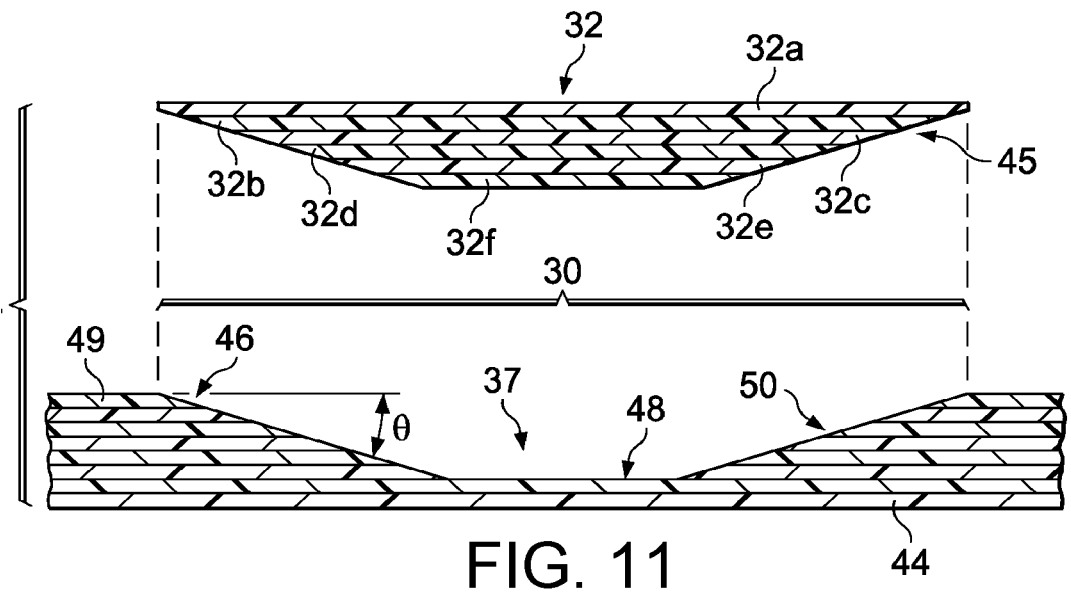
FIG. 11 is a diagram representing a cross-sectional view of an area of the composite skin requiring rework prior to the installation of a rework patch having tapered edges.

Attention is now directed to FIG. 11 which illustrates an alternate embodiment of the disclosed rework patch 32 which is suitable for use in a scarf-type rework of the laminate composite structure 44. In this example, material is removed from the laminate composite structure 44, as by, for example, sanding, leaving the edges 50 of the rework area 30 tapered or "scarfed" at a desired angle θ. The rework patch 32 comprises a plurality of laminated reinforced resin plies 32*a*-32*f* having outer edges 45 that are each tapered to substantially match the taper angle θ of the cavity 37. The size, orientation and shape of the work patch 32 are nearly identical to the size, orientation and shape of the rework cavity 37, resulting in a nearly perfect fitment between the rework patch 32 and the rework area 30.

Figure 12:
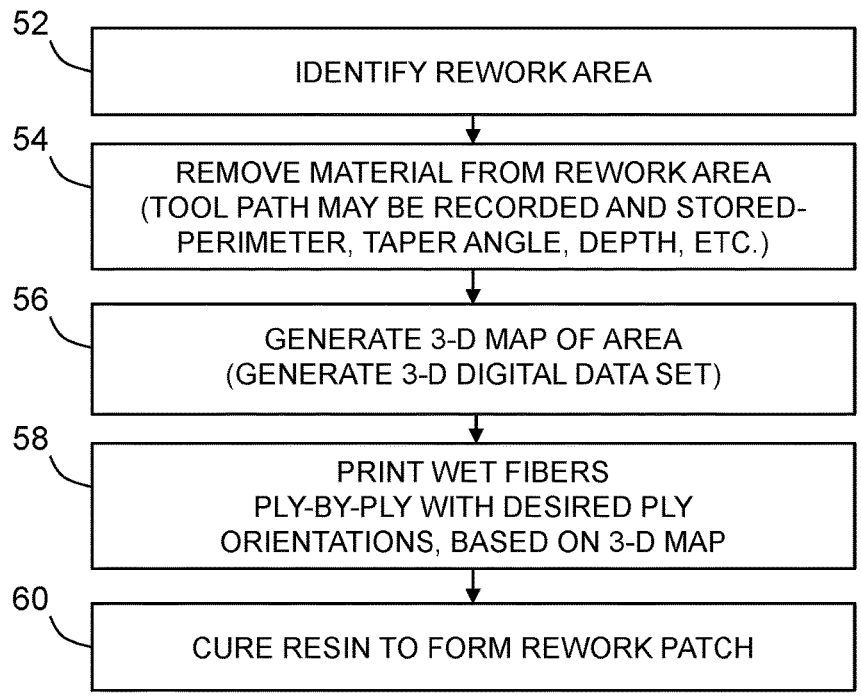
FIG. 12 is a flowchart identifying steps of a method for reworking an area of a composite structure.

FIG. 12 broadly illustrates the overall steps of a method of reworking a composite structure 44 using the disclosed composite laminate rework patch 32. Beginning at step 52, the area 30 of the structure requiring rework is identified using any of a variety of techniques, such as, for example and without limitation, visual surface inspection or ultrasonic sound interrogation. At step 54 material is removed from the rework area 30 to reduce or eliminate one or more non-conformities. The material removal may be accomplished manually or automatically. Where material removal is accomplished using automated equipment, the path of the material removal tool (i.e. the tool path) may be recorded and stored as digital data. The tool path establishes the shape and length of perimeter, taper angle, depth of cut, etc. of the cavity 37.

Continuing with reference to FIG. 12, at step 56, a 3-D map of the rework area 30 is generated. The 3-D map comprises a set of digital data which is a 3-D representation of the rework area 30, including the cavity 37. The set of digital data may be produced using any of several techniques. For example, the set of digital data may be generated by recording the path of movement of a material removal tool carried out in step 54. Alternatively, optical scanning techniques may be employed in which the rework area including the cavity 37 is optically scanned, and the optical scan is converted to digital data representing a 3-D map. At step 58, the wet fiber rovings are printed ply-by-ply to form a rework patch that fills the cavity 37 based on the 3-D map generated in step 56. Each ply of the resulting rework patch has a specified size, shape and fiber orientation. Finally, at step 60, the rework patch 32 is allowed to cure or ambient temperature.

Figure 13:
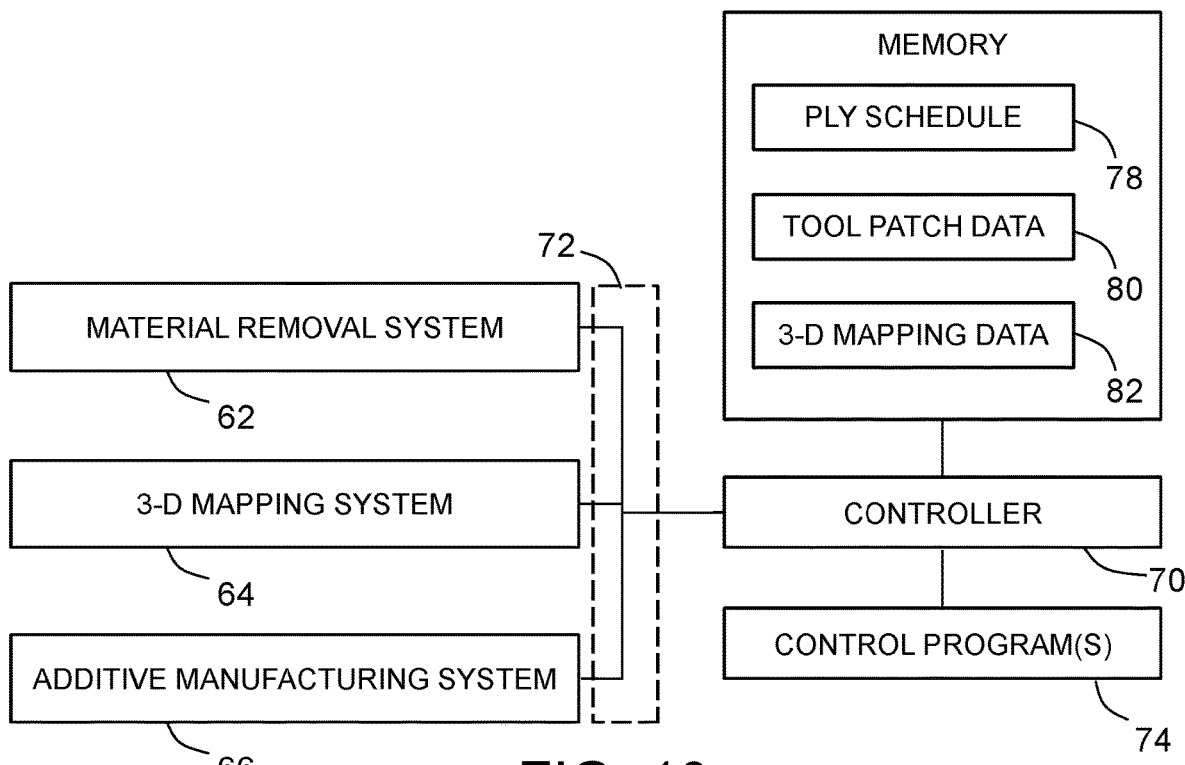
FIG. 13 is a block diagram identifying some components of a system for reworking an area of a composite structure.

FIG. 13 broadly illustrates an integrated system 75 for reworking a structure such as the composite laminate composite structure 44 depicted in FIGS. 10 and 11. Broadly, the system 75 comprises a material removal system 62, a 3-D mapping system 64 and an additive manufacturing system 66, all operated by a controller 70 (or multiple controllers). The material removal system 62, 3-D mapping system 64 and additive manufacturing system 66 may be coupled to a common network 72, as is the controller 70. In alternative embodiments, each system may be a stand-alone independent system operated by a respective controller.

The controller 70 may be operated in accordance with one or more control programs 74, and may be coupled with a memory 76 for storing various types of information such as, without limitation, a ply schedule 78 for a laminated composite structure 44, tool path data 80 and 3-D map data 82. The ply schedule 78 may comprise information defining how the laminate composite structure 44 is constructed, including, for example and without limitation, the number of plies, ply shape, ply thicknesses and fiber orientations. The tool path data 80 may comprise a set of digital information that is generated, either to control the path of a material removal tool, or which is recorded as the material removal tool is displaced either manually or under automatic control during the material removal process. The 3-D map data 82 comprises a set of digital data which represents the rework area 30 including the cavity 37, and thus the rework patch 32, in three dimensions.

The material removal system 62 may comprise a power tool that is moved along a desired tool path by a manipulator such as a robot (not shown). The tool may comprise, without limitation, a sander, a grinder or a mill. The tool and manipulator are operated by a controller which may comprise, for example and without limitation, a computer configured to execute pre-programmed sequences of machine control commands.

The 3-D mapping system 64 may comprise an optical scanner that is controlled by a computer. The optical scanner scans the rework area 30 and generates a set of digital data representing a 3-D topographical map of the rework area 30, including a 3-D map of the cavity 37.

The additive manufacturing system 66 may be the system shown in FIGS. 1-7 above. The additive manufacturing system 66 produces each ply 32a-32f of the rework patch 32 ply-by-ply. The additive manufacturing system 66 may include memory for storing digital data representing information used to produce the rework patch 32, including but not limited to digital data sets representing the ply schedule 78 (FIG. 13), 3-D map data and tool path data 80.

Figure 14:
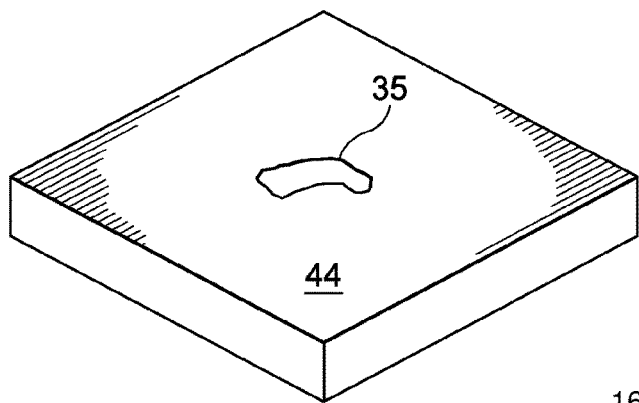
FIG. 14 is a diagram representing a view of a composite structure having a non-conformity therein.
Figure 15:
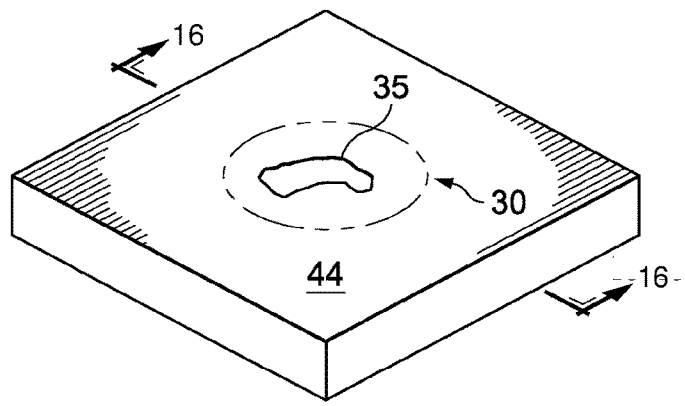
FIG. 15 is a diagram similar to FIG. 14, with the addition of an outline of the area to be reworked in order to remove the non-conformity.
Figure 16:
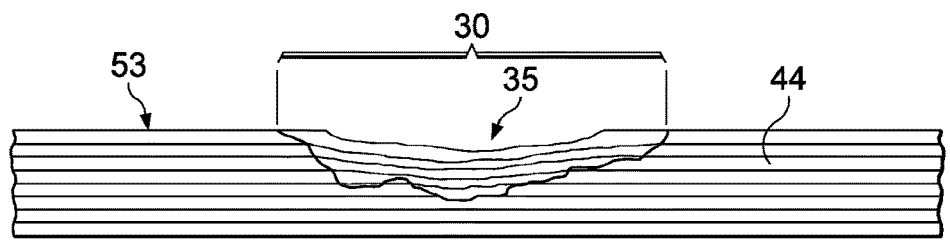
FIG. 16 is a diagram representing a cross-sectional view of the area of the composite skin requiring rework depicted in FIG. 15, the sectional view being taken along the line 16-16 indicated in in FIG. 15.

Attention is now directed to FIGS. 14-19 which diagrammatically illustrate the steps involved in reworking a composite structure 44 having a localized non-conformity 35. FIG. 14 shows a composite structure 44 having a localized non-conformity 35 that must be reduced or eliminated to restore the original structural performance of the composite structure 44. In the illustrated example depicted in FIGS. 15 and 16, the non-conformity 35 comprises a dent which extends from one outer surface 53 of the composite structure 44 partially through the thickness of the composite structure 44. In order to rework and restore the composite structure 44, a rework area 30 is initially identified which has a size and shape that is larger than the non-conformity 35. The shape of the rework area 30 may depend upon the shape of the non-conformity 35. The rework area 30 may be symmetric, asymmetric, regular or irregular.

Figure 17:
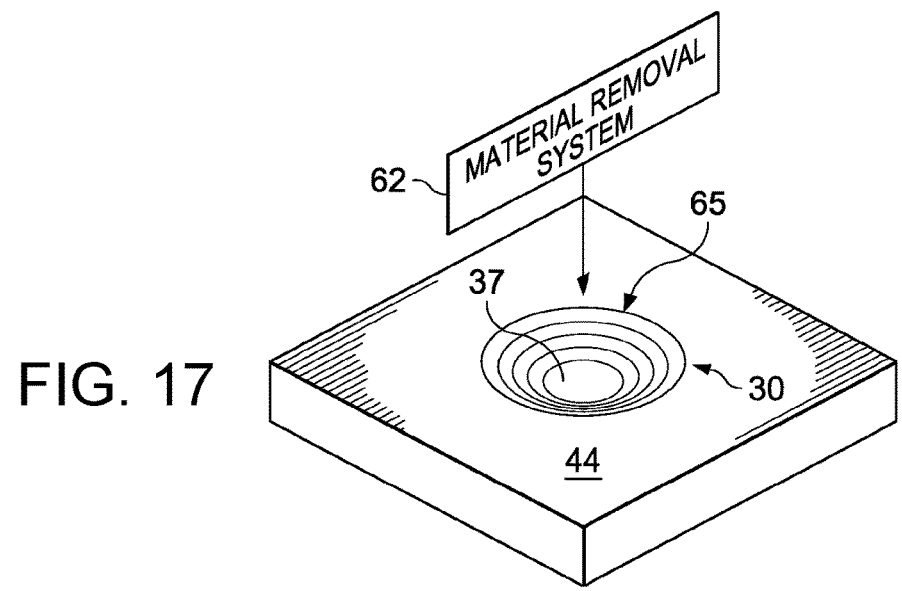
FIG. 17 is a diagram similar to FIG. 14, but showing material having been removed from the rework area by a material removal system.

Referring to FIG. 17, the material removal system 62 is then employed to remove material from the composite structure 44, including the material containing the non-conformity 35. As previously discussed, the material removal process may be performed using a sander, a grinder, a mill or other tool that is suitable for the particular application, and is compatible with the type of material being removed. Removal of the material from the composite structure 44 results in a cavity 37 being formed in the composite structure 44 which, in the illustrated example, extends only partially through the thickness of the structure of 44. In the case of a laminate composite structure 44, the material removal process reveals ply drop-offs 65 along the edges 50 (see FIGS. 10 and 11) of the cavity 37. Depending upon the type of rework process employed, the edges 50 may be tapered, or stepped as previously discussed in connection with FIGS. 10 and 11.

Figure 18:
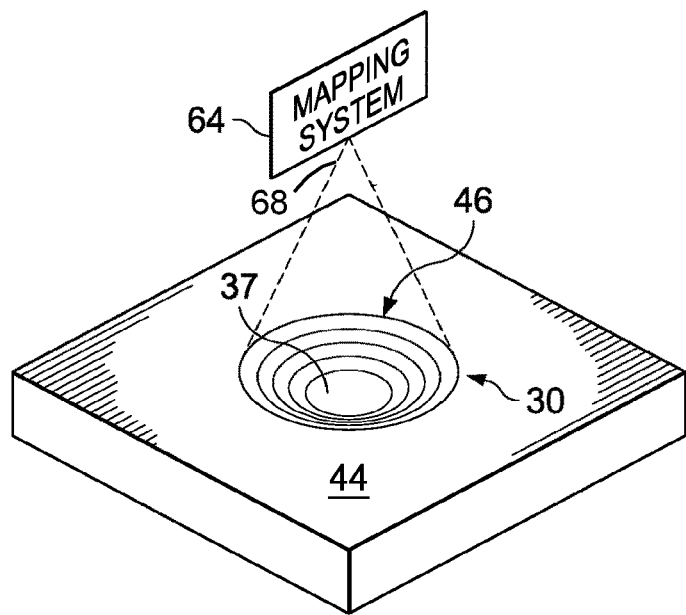
FIG. 18 is a diagram similar to FIG. 14, but showing a mapping system generating a 3-D digital representation of the rework area.

Referring now to FIG. 18, after material has been removed from the composite structure 44 to form a cavity 37, the mapping system 64 uses a scanning laser beam 68 to scan the cavity 37 and generate a set of digital data representing a 3-D map of the cavity 37. The 3-D map includes identification of the size, orientation and shape of the peripheral edge 46 of the cavity 37 as well as other topographic features of the cavity 37, including the locations of the ply drop-offs, the size, orientation and shape of the bottom 48 (FIGS. 10 and 11), the edges 50, as well as the taper angle.

Figure 19:
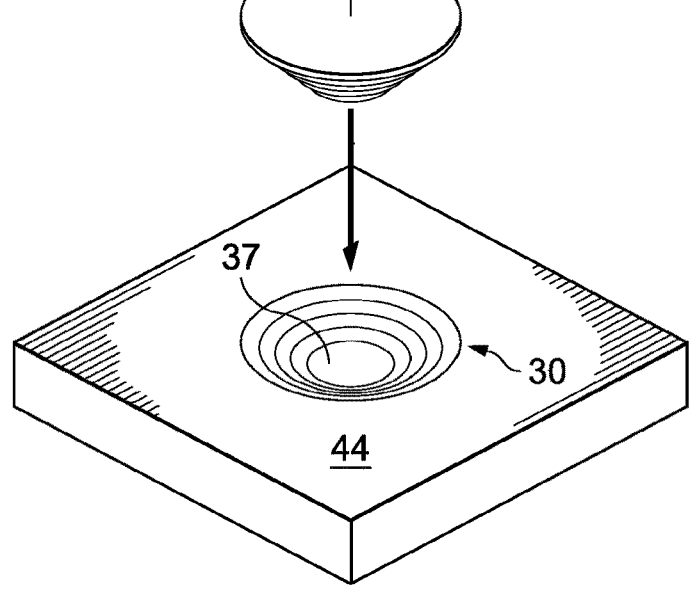
FIG. 19 is a diagram representing a scenario wherein an additive manufacturing system is being used to directly lay wet fibers onto the rework area, which laid fibers are coated with epoxy that will later be cured to form a rework patch in place of the non-conformity.

The next step in the rework process is shown in FIG. 19, wherein the additive manufacturing system 66 is used to successively lay down epoxy-impregnated fiber rovings side by side to form a first ply 32a on the bottom of the cavity 37; and then successively lay down epoxy-impregnated fiber rovings side by side to form a second ply 32b on top of the first ply 32a; and so forth until (for example) the cavity 37 is filled with a stack of plies 32a-32f, which stack is depicted outside the cavity so that the respective plies can be seen. Using the stored ply schedule 78 (see FIG. 13) and the 3-D map data 82, the additive manufacturing system 66 may build the plies 32a-32f in the correct order, with the correct ply orientation and in alignment with each other.

After the printing is over, the reworked area is vacuum bagged and subjected to post-curing (e.g., at 80° C.) in order to speed up the curing process and to enhance some of the composite material's physical properties. Post curing will expedite the cross-linking process and properly align the polymer's molecules. Post-curing thermoset resins can increase physical properties (e.g., tensile strength, flexural strength, and heat distortion temperature) above what the material would normally achieve at room temperature. Post-curing is particularly important when secondary machining is expected.

Fiber-reinforced resin composite technology can be used to create a wide variety of airframe structural elements, many of which have airfoil shapes, such as flaps, ailerons, elevators and rudders, for examples. The entire airframe of some aircraft, including the fuselage, wings and horizontal and vertical stabilizers, have been formed entirely of fiber-reinforced resin composites.

Figure 20:
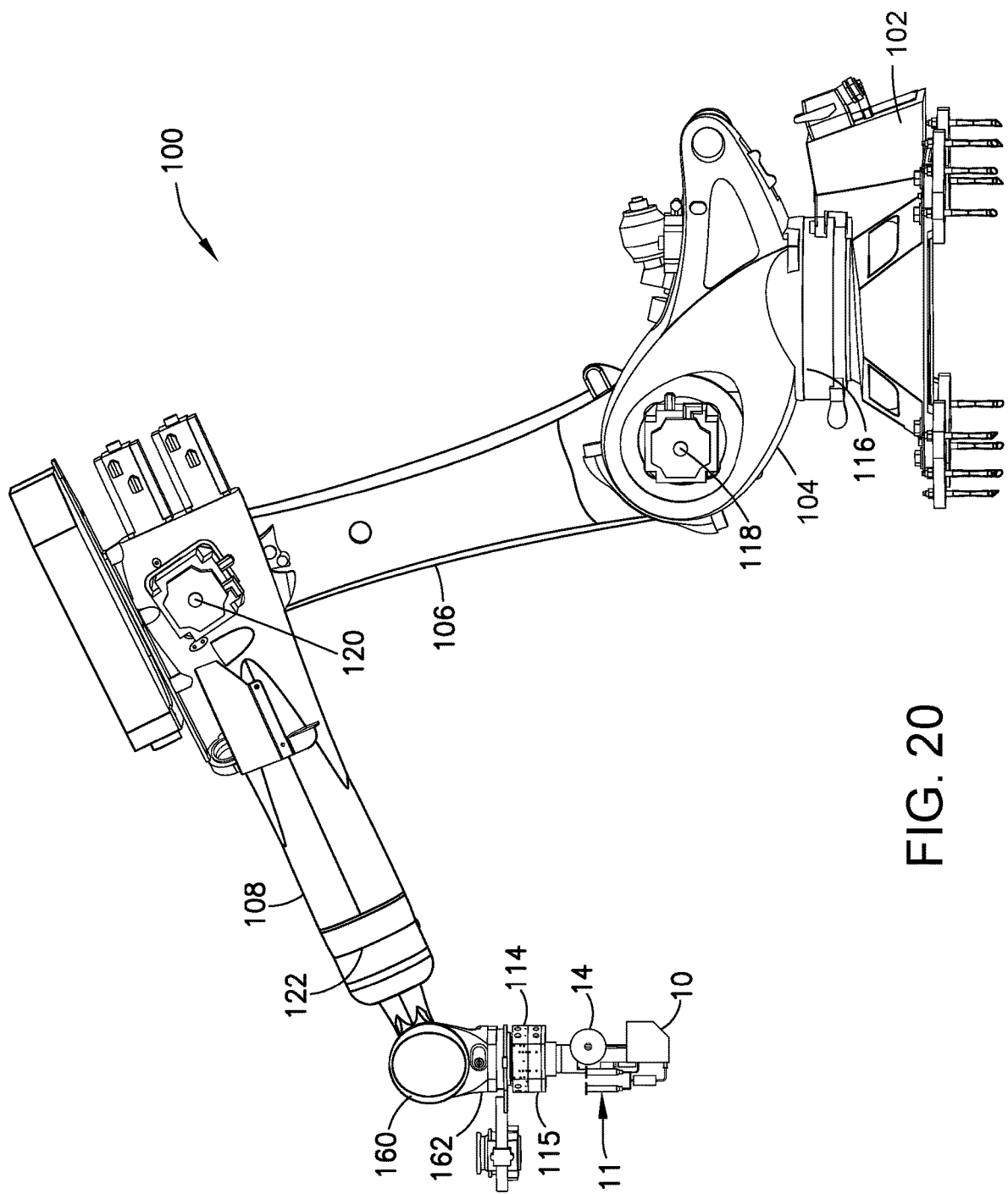
FIG. 20 is a diagram representing an elevational view of a 3-D printer mounted to a robot.

As mentioned previously, a 3-D printing apparatus of the type disclosed herein can be mounted on a robot instead of a multistage positioner. FIG. 20 is a diagram representing an elevational view of a 3-D printing apparatus mounted to a robot 100. The 3-D printing apparatus comprises a 3-D printer head 10, a pneumatic dispenser 11 and a dry fiber roll 14. The 3-D printing apparatus is attached to the robot 100 by attaching a tool-side connector plate 115 to a connector 114 of the robot 100. As the printer head 10 is moved along the composite structure being repaired, an epoxy-impregnated fiber roving can be printed on the surface of the composite substrate.

The robot 100 has multi-axis movement capabilities and uses software support to generate a three-dimensional profile to be used for 3-D printing. In particular, the robot 100 shown in FIG. 20 comprises a robot base 102, a carousel 104, a rocker 106 (a.k.a. pivot arm), an extension arm 108, a robot hand 110, and a member 112 to which the connector 114 is attached. The robot base 102 and carousel 104 are rotatably coupled by a revolute joint 116. The carousel 104 and rocker 106 are rotatably coupled by a revolute joint 118. The rocker 106 and extension arm 108 are rotatably coupled by a revolute joint 120. The rocker extension arm 108 and robot hand 110 are rotatably coupled by a revolute joint 122. The combination of these components provides multiple degrees of freedom, which in turn allows the printer head 10 to be moved to different locations and in different directions. The robot 100 includes one or more positional sensors (not shown) at, or otherwise associated with, each of the pivots that provide positional data (X, Y, and Z in three-dimensional space) for accurately locating the printing roller. An example of a robot 100 that could be employed with the printer head shown in FIG. 3 is robot Model KR-150 manufactured by Kuka Roboter GmbH (Augsburg, Germany), although any robot or other manipulator capable of carrying a printer head 10 could be used.

While apparatus and methods for automating the fiber laying process during the repair of composite structures have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

Some steps of the methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. An automated method for adding composite material to a composite structure under computer control, comprising:
   mixing liquid epoxy and liquid hardener in a mixer to form the epoxy-hardener mixture;
   feeding epoxy-hardener mixture from the mixer to a printing roller;
   absorbing epoxy-hardener mixture in a mixture-absorbing layer of the printing roller;
   wetting successive portions of a continuous fiber roving by desorbing epoxy-hardener mixture from the mixture-absorbing layer of the printing roller;
   passing each successive portion of the continuous fiber roving through a nip formed by the printing roller and the composite structure with desorbed epoxy-hardener mixture applied thereon; and
   continuously laying down successive wetted portions of the continuous fiber roving on the composite structure with pressure exerted by the printing roller.

2. The method as recited in claim 1, further comprising:
   cutting the fiber roving to establish a length of fiber roving to be laid; and
   allowing the epoxy-hardener mixture on the length of fiber roving to cure in place on the composite structure at ambient temperature.

3. The method as recited in claim 1, wherein the fiber roving is a continuous bundle of unidirectional reinforcement fibers, the method further comprising paying out the fiber roving from a roll.

4. The method as recited in claim 1, further comprising removing material from an area of the composite structure that includes a non-conformity until the non-conformity is removed and a cavity is formed, wherein the wetted successive portions of fiber roving are laid inside the cavity.

5. An automated method for adding composite material to a composite structure, comprising:
   (a) placing a printing roller adjacent to a first area of the composite structure to form a nip therebetween;
   (b) transferring an epoxy-hardener mixture in a liquid state onto the printing roller;
   (c) rotating the printing roller;
   (d) feeding a fiber roving through the nip;

(e) transferring the epoxy-hardener mixture from the printing roller to a portion of the fiber roving that is passing through the nip; and (f) pressing the portion of the fiber roving with the transferred epoxy-hardener mixture on the composite structure, wherein steps (d) through (f) are performed while the printing roller is rotating under computer control, step (b) comprises absorbing epoxy-hardener mixture in a mixture-absorbing layer of the printing roller and step (e) comprises wetting the portion of the fiber roving that is passing through the nip with epoxy-hardener mixture that has desorbed from the mixture-absorbing layer of the printing roller.

6. The method as recited in claim 5, further comprising attaching the mixture-absorbing layer of the printing roller around a periphery of a roller core of the printing roller.

7. The method as recited in claim 5, wherein at least steps (c) through (f) are continuously performed until a first length of fiber roving with transferred epoxy-hardener mixture has been pressed on the composite structure.

8. The method as recited in claim 7, further comprising cutting the fiber roving at a position upstream from the nip to produce the first length of fiber roving.

9. The method as recited in claim 8, further comprising:
placing the printing roller adjacent to a second area of the composite structure with a nip therebetween;
repeating steps (b) through (f), wherein at least steps (d) through (f) are continuously performed until a second length of fiber roving with transferred epoxy-hardener mixture has been pressed on the composite structure; and
cutting the fiber roving at a position upstream from the nip to produce the second length of fiber roving.

10. The method as recited in claim 9, wherein the first and second lengths of fiber roving are adjacent to each other on the composite structure.

11. The method as recited in claim 10, further comprising allowing the epoxy-hardener mixture on the first and second lengths of the fiber roving to cure at ambient temperature.

12. The method as recited in claim 5, wherein the fiber roving is a continuous bundle of unidirectional reinforcement fibers, the method further comprising paying out the fiber roving from a roll.

13. The method as recited in claim 5, further comprising mixing liquid epoxy and liquid hardener in a mixer to form the epoxy-hardener mixture, wherein step (c) comprises feeding epoxy-hardener mixture from the mixer to the printing roller.

* * * * *